United States Patent [19]
Taylor et al.

[11] Patent Number: 6,059,870
[45] Date of Patent: May 9, 2000

[54] INK COMPOSITIONS, PROCESSES FOR MAKING THEM AND USES THEREOF

[75] Inventors: John Anthony Taylor, Prestwich; Peter Gregory, Blackley, both of United Kingdom

[73] Assignee: Zeneca Limited, London, United Kingdom

[21] Appl. No.: 09/171,676

[22] PCT Filed: Mar. 18, 1997

[86] PCT No.: PCT/GB97/00739

§ 371 Date: Oct. 23, 1998

§ 102(e) Date: Oct. 23, 1998

[87] PCT Pub. No.: WO97/40108

PCT Pub. Date: Oct. 30, 1997

[30] Foreign Application Priority Data

Apr. 25, 1996 [GB] United Kingdom .................. 9608488

[51] Int. Cl.$^7$ ............................ C09D 11/02; G03G 9/09; B32B 3/00; B32B 27/14
[52] U.S. Cl. .................... 106/31.43; 106/31.47; 106/31.48; 106/31.51; 106/31.5; 106/31.52; 106/31.49; 427/466; 428/195; 430/106
[58] Field of Search .............................. 106/31.43, 31.47, 106/31.48, 31.49, 31.5, 31.51, 31.52; 427/466; 428/195; 430/106

[56] References Cited

U.S. PATENT DOCUMENTS

| | | | |
|---|---|---|---|
| 3,646,002 | 2/1972 | Andrew et al. | 534/624 |
| 3,664,995 | 5/1972 | Andrew et al. | 534/624 |
| 3,826,799 | 7/1974 | Waring | 534/621 |
| 4,038,267 | 7/1977 | Sueda et al. | 534/636 |
| 4,148,790 | 4/1979 | Sueda et al. | 534/636 |
| 4,230,852 | 10/1980 | Sueda et al. | 534/636 |
| 4,664,708 | 5/1987 | Allen | 106/31.47 |
| 4,962,190 | 10/1990 | Mayer et al. | 106/31.51 |
| 5,534,052 | 7/1996 | Mennicke et al. | 106/31.43 |
| 5,733,363 | 3/1998 | Nagashima et al. | 106/31.43 |
| 5,820,661 | 10/1998 | Gregory et al. | 106/31.48 |
| 5,972,084 | 10/1999 | Lacroix et al. | 106/31.48 |

FOREIGN PATENT DOCUMENTS

| | | |
|---|---|---|
| 0223501 | 5/1987 | European Pat. Off. . |
| 0317859 | 5/1989 | European Pat. Off. . |
| 0657509 | 6/1995 | European Pat. Off. . |
| 2425283 | 5/1974 | Germany . |

*Primary Examiner*—Helene Klemanski
*Attorney, Agent, or Firm*—Rothwell, Figg, Ernst & Kurz

[57] ABSTRACT

An ink composition comprising a water-soluble reactive dye comprising at least three chromophoric groups linked to a polyamine; and a medium comprising at least one of a low melting point solid, an organic solvent and a mixture of water and one or more water-soluble organic solvent(s).

16 Claims, No Drawings

INK COMPOSITIONS, PROCESSES FOR MAKING THEM AND USES THEREOF

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to a first feature of the present invention there is provided an ink composition comprising a water-soluble reactive dye comprising at least three chromophoric groups linked to a polyamine; and a medium comprising at least one of a low melting point solid, an organic solvent and a mixture of water and one or more water-soluble organic solvent(s).

The water-soluble reactive dye preferably comprises 3, 4 or 5, more preferably 3 or 4, especially 3 chromophoric groups linked to a polyamine. The chromophoric groups can be different from each other, but they are preferably identical to each other.

The polyamine to which the chromophoric groups are linked preferably consists of at least three amino groups, more preferably three to six, especially three or four amino groups, joined together by optionally substituted aliphatic groups. The amino groups are preferably attached to one or two —CH$_2$— groups (as illustrated in —HN—CH$_2$— and —CH$_2$—N(-)—CH$_2$—). Preferred polyamines are linear polyamines, for example of the Formula (I), or branched polyamines, for example of Formula (II), wherein each R$^1$ independently is H or optionally substituted alkyl, n has a value of 2 to 10, preferably 2 to 6, more preferably 2, and p has a value of 2 to 6, more preferably 2 or 3:

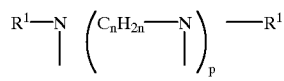

Formula (I)

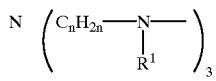

Formula (II)

Reactivity of the dyes is preferably provided by means of a reactive triazine or pyrimidine group, more preferably a reactive triazine group linking the chromophoric groups to amino groups in the polyamine. The reactive triazine group is preferably an s-triazine group having a labile atom or group at the 2-,4 or 6-position, for example a group of the formula:

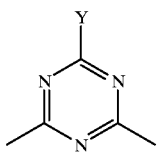

wherein Y is a labile atom or group.

In light of the above preference for amino groups being attached to —CH$_2$— groups and the chromophoric groups being linked to the nitrogen atoms by means of reactive triazine groups it is preferred for the water-soluble reactive dyes to contain at least 3, more preferably 3,4 or 5, especially 3 or 4, more especially 3 groups of the Formula (III):

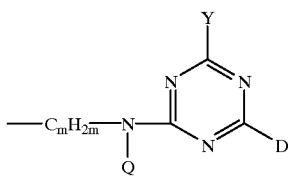

Formula (III)

wherein:

m is from 1 to 6;

Q is H or optionally substituted alkyl or alkylene;

Y is a labile atom or group; and

D is a chromophoric group.

Preferably m is 2, 3 or 4, more preferably 2 or 3, especially 2.

Q is preferably H, C$_{1-4}$-alkyl or C$_{2-4}$-alkylene, more preferably H, methyl or —CH$_2$CH$_2$—, especially H or —CH$_2$CH$_2$—.

As will be understood, when Q is H or optionally substituted alkyl the chromophoric group D is a chain terminating chromophoric group and when Q is optionally substituted alkylene then D is a pendent chromophoric group. Thus a dye comprising three chromophoric groups linked to diethylene triamine would have two terminating chromophoric groups and one pendent chromophoric group. When the polyamine is tris(2-aminoethyl)amine the corresponding dye would have three terminating chromophoric groups and zero pendent chromophoric groups.

One preferred class of dye, is of the formula N(Z)$_3$ wherein each Z independently is of the formula (III) defined above, with the proviso that Q is H or optionally substituted alkyl, preferably H or C$_{1-4}$-alkyl, especially H.

A second preferred class of dye of the Formula (IV):

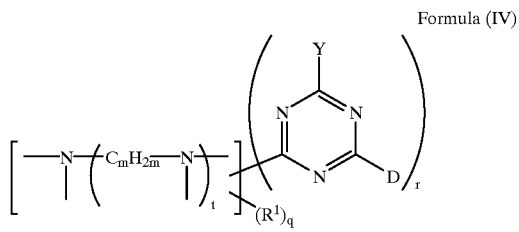

Formula (IV)

wherein t is 2, 3 or 4;

r is 3, 4or 5;

q is (t+3)−r; and

Y, $R^1$, m and D are as hereinbefore defined.

In a preferred embodiment the dye is of Formula (III) wherein at least one D is a chromophore other than an azo chromophore.

$R^1$ is preferably H or $C_{1-4}$-alkyl, more preferably H.

By a labile atom or group it is meant an atom or group which is bound by a chemical bond to the triazine nucleus, which atom or group is displaceable by a hydroxyl group of cellulose under mildly alkaline aqueous conditions to form a covalent bond between the triazine nucleus and cellulose. As examples of such atoms or groups there may be mentioned halogen atoms, for example F and Cl; sulphonic acid groups; thiocyano groups; quaternary ammonium groups, for example trialkylammonium groups and optionally substituted pyridinium groups, for example 3- and 4-carboxy pyridinium groups.

When $R^1$, Q or an aliphatic group is substituted the substituent is preferably selected from hydroxy, amino, halo, carboxy and sulpho.

In a preferred embodiment the dye is free from —$SO_2CH=CH_2$ groups and groups which are convertible on treatment with aqueous alkali to —$SO_2CH=CH_2$ groups (e.g. —$SO_2CH_2CH_2OSO_3H$, —$SO_2CH_2CH_2SSO_3H$, —$SO_2CH_2CH_2OPO_3H$ and —$SO_2CH_2CH_2Cl$). Preferably the only reactive groups in the dyes are reactive triazine groups.

The chromophoric groups preferably each independently comprise an azo, anthraquinone, phthalocyanine, triphenodioxazine or formazan group.

Preferred azo groups are monoazo and disazo groups. Preferred monoazo groups are formula L—N=N—$L^1$—$NR^1$— wherein L is an aryl or heteroaryl group, $L^1$ is an arylene group and $R^1$ is as hereinbefore defined.

It is preferred that each aryl or arylene group independently is a mono- or di-cyclic aryl or arylene group. Preferred aryl groups are optionally substituted phenyl and optionally substituted naphthyl, and preferred arylene groups are optionally substituted phenylene and optionally substituted naphthylene. Preferred heteroaryl groups are pyridonyl and pyrazolonyl.

A first preferred monoazo group is of the Formula (VI) or salt thereof:

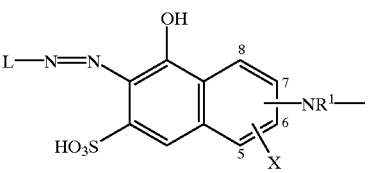

Formula (VI)

wherein:

X is H or sulpho; and

L and $R^1$ are as hereinbefore defined.

L is preferably optionally substituted phenyl or naphthyl, especially a phenyl or naphthyl group having at least one sulpho substituent. Further optional substituents which may be present on L include a halogen atom, especially chlorine; an alkyl radical, especially $C_{1-4}$-alkyl, more especially methyl; an acylamino radical, especially acetylamino, benzamido or sulphonated benzamido; amino; hydroxy; and an alkoxy radical, especially $C_{1-4}$-alkoxy, more especially methoxy.

As examples of phenyl groups having at least one sulpho substituent there may be mentioned 2-, 3- or 4-sulphophenyl; 2-sulpho-4-nitrophenyl; 2-sulpho-5-nitrophenyl; 4-sulpho-2-methylphenyl; 5-sulpho-2-methylphenyl; 2-sulpho4methylphenyl; 5-sulpho-2-methoxyphenyl; 2-sulpho4-methoxyphenyl; 4-sulpho-2-chlorophenyl; 5-sulpho-2-carboxyphenyl; 2,4-disulphophenyl; 2,5-disulphophenyl; and 3,5-disulphophenyl.

As examples of naphthyl groups having at least one sulpho substituent there may be mentioned 1-sulphonaphth-2-yl; 1,5,7-trisulphonaphth-2-yl; 3,6,8-trisulphonaphth-2-yl; 5,7-disulphonaphth-2-yl; 6-sulphonaphth-2-yl; 4,5-, 6-, or 7-sulphonaphth-1-yl; 4,8-disulphonaphth-1-yl; 3,8-disulphonaphth-1-yl; 2,5,7-trisulphonaphth-1-yl; and 3,5,7-trisulphonaphth-1-yl.

Preferred optional substituents which may be present on $L^1$ are those mentioned above for L.

In groups of Formula (VI), —$NR^1$— is preferably at the 6-, 7- or 8-position, especially the 6- or 8-position. When —$NR^1$— is at the 8-position, it is preferred that X is a sulpho group at the 5- or 6-position.

A second preferred monoazo group is of the Formula (VII) or a salt thereof:

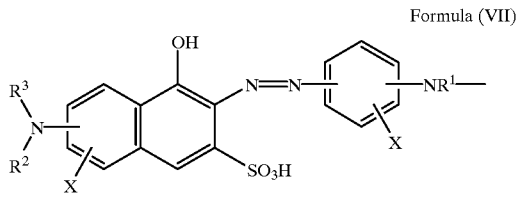

Formula (VII)

wherein:

$R^3$ is H or $C_{1-4}$-alkyl;

$R^2$ is H. $C_{1-4}$-alkyl, $C_{1-4}$-alkanoyl or optionally substituted benzoyl, especially benzoyl or sulphobenzoyl, acetyl, propanoyl, n-butanoyl or iso-butanoyl; and X and $R^1$ are as hereinbefore defined.

A third preferred monoazo group is of the Formula (VIII) or salt thereof:

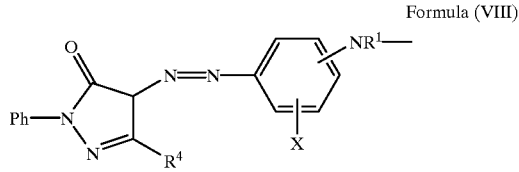

Formula (VIII)

wherein:

Ph is an optionally substituted phenyl group, especially sulphophenyl;

$R^4$ is CN, $CH_3$ or carboxy; and $R^1$ and X are as hereinbefore defined.

A fourth preferred monoazo group is of the Formula (IX) or salts thereof:

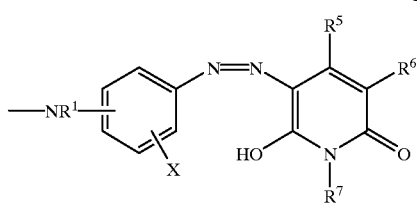

Formula (IX)

wherein:

$R^1$ and X are as hereinbefore defined;

$R^5$ is $C_{1-4}$alkyl or phenyl;

$R^6$ is H, —CN, —$NO_2$, —$CONH_2$, —CONH($C_{1-4}$alkyl) or —CO($C_{1-4}$alkyl)$_2$; and $R^7$ is H, optionally substituted $C_{1-6}$alkyl, optionally substituted phenyl or optionally substituted naphthyl.

It is preferred that $R^5$ is methyl.

Preferred optional substituents which may be present on $R^7$ are as hereinbefore defined for L.

A preferred disazo group is of Formula (X) or salt thereof:

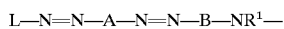 Formula (X)

wherein:

A and B are each independently optionally substituted phenylene or naphthylene; and $R^1$ and L are as hereinbefore defined.

It is preferred that B is optionally substituted naphthylene and A is optionally substituted phenylene. The optional substituents which may be present on A or B are preferably independently selected from halo, especially chloro; alkoxy, especially $C_{1-4}$-alkoxy; alkyl, especially methyl; sulpho; carboxy; hydroxy; amino; acylamino especially as acetamido, benzamido and sulphonated benzamido, and pyrimidinylamino or triazinylamino cellulose-reactive groups.

As Examples of groups represented by A and B there may be mentioned -phenylene, sulphophenylene, ureidophenylene, 7-sulpho-1,4-naphthylene, 6-sulpho-1,4-naphthylene and 8-sulpho-1,4-naphthylene.

A preferred anthraquinone group is of the Formula (XI) or a salt thereof:

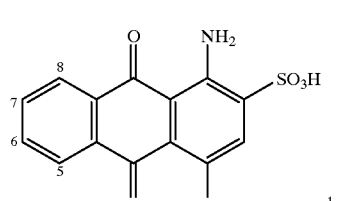

Formula (XI)

wherein the anthraquinone nucleus optionally contains a sulphonic acid group in the 5-, 6-, 7-, or 8-position; V is a divalent organic linking group, preferably of the benzene series; and $R^1$ is as hereinbefore defined.

V is preferably phenylene, diphenylene, or 4,4'-divalent stilbene or azobenzene radicals which are optionally sulphonated. It is preferred that V contains one sulphonic acid group for each benzene ring present therein.

A preferred phthalocyanine group is of the Formula (XII) or a salt thereof:

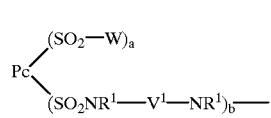

Formula (XII)

wherein Pc is a metallo-phthalocyanine nucleus, preferably copper or nickel phthalocyanine; each $R^1$ is as hereinbefore defined; each W independently is a hydroxy or a substituted or unsubstituted amino group, $V^1$ is a divalent organic linking group, preferably a $C_{1-4}$-alkylene or phenylene linking group; and a and b are each independently 1, 2 or 3 provided that a+b is not greater than 4.

A preferred triphenodioxazine group is of the Formula (XIII) or a salt thereof:

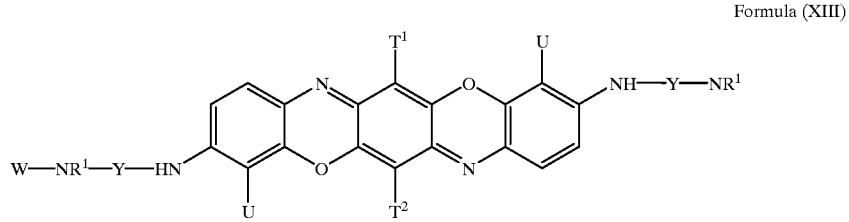

Formula (XIII)

wherein:

each Y independently is a covalent bond, $C_{2-4}$-alkylene, phenylene or sulphophenylene;

U is H or $SO_3H$;

W is an optionally substituted triazine group;

$T^1$ and $T^2$ are halo, especially chloro, $C_{1-4}$alkyl, or $C_{1-4}$-alkoxy; and each Z and $R^1$ independently is as hereinbefore defined.

Each Y is preferably —$C_2H_4$— or —$C_3H_6$—, U is preferably $SO_3H$, and $T^1$ and $T^2$ are preferably Cl, methyl or ethyl.

W is preferably a triazine group having one or two a labile atoms or groups.

A preferred formazan group is of the Formula (XIII) or a salt thereof:

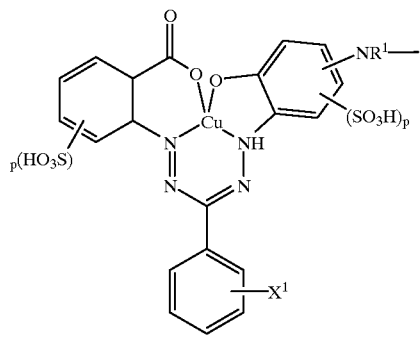

Formula (XIV)

wherein:

$X^1$ is H, $SO_3H$ or Cl;

each p independently has a value of 0, 1 or 2; and $R^1$ is as hereinbefore defined;

provided that the formazan group has at least one, and preferably at least two, sulpho groups.

It is preferred that each p has a value of 1.

Where the reactive dye carries acid groups such as $SO_3H$ or $CO_2H$ these may be in free acid form, but are preferably in the form of a salt with one or more cations. Preferred cations are selected from an alkali metal, ammonium and optionally substituted $C_{1-4}$-alkylammonium cations. Preferred alkali metal cations include lithium, sodium and potassium. A preferred $C_{1-4}$-alkylammonium cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl)ammonium and mono-, di, tri- and tetra-(hydroxy$C_{1-4}$-alkyl) ammonium. It is preferred that the reactive dye is a salt with an $NH_4^+$ cation or a mono- or poly-, methyl- or ethylammonium cation or with a mixture of two or more cations, especially a mixture of alkali metal and optionally substituted ammonium cations. Examples of optionally substituted $C_{1-4}$-alkylammonium cations include mono-, di-, tri- and tetra-methylammonium, mono-, di-, tri- and tetra-ethylammonium and mono-, di-, tri- and tetra-(2-hydroxyethyl)ammonium.

The reactive dye may be converted wholly or partially into its ammonium or optionally substituted $C_{1-4}$-alkyl ammonium salt by dissolving in water the reactive dye in the form of a salt with an alkali metal, acidifying the solution with a mineral acid, such as hydrochloric acid, separating the precipitating compound in free acid form, suspending it in water, adjusting the pH of the suspension to 9 to 9.5 with ammonia or an optionally substituted $C_{1-4}$-alkylamine to form the water-soluble ammonium or $C_{1-4}$-alkylammonium salt and removing the alkali metal chloride ions by dialysis. Alternatively the alkali metal ion may be exchanged for an optionally substituted ammonium ion by a conventional ion exchange method.

The dyes may be prepared by a method comprising condensation of one or more reactive dyes having at least two reactive groups with a polyamine, preferably in a liquid medium. It is preferred that the condensation is performed at 10° C. to 70° C., especially 20 to 50° C., more especially 20 to 40° C. The liquid medium is preferably an aqueous medium, especially water. The condensation is preferably performed at a pH in the range 6 to 9, more preferably 7.5 to 8.5. It is preferred to use an excess of the reactive dye, for example 3 to 5 moles of the reactive dye per mole of polyamine when the polyamine is tris(aminoalkyl)amine, more preferably 2.5 to 3.5, especially about 3.

Examples of suitable polyamines which can be used in the method include tris(2-aminoethyl)amine, diethylene triamine, dipropylene triamine, triethylene tetramine, mono-N-(2-aminoethyl) dipropylene triamine, N,N'-bis(3-aminopropyl)butylenediamine, mono-N-(2-hydroxyethyl) triethylene tetramine, tetraethylene pentamine and pentaethylene hexamine. Preferably the polyamine has a molecular weight below 599.

The ink compositions of the present invention preferably contain from 0.5% to 20%, more preferably from 0.5% to 15%, and especially from 1% to 3%, by weight of the dye based on the total weight of the ink. Although many ink compositions contain less than 5% by weight of colorant, it is desirable that the dye has a solubility of around 10% or more to allow the preparation of concentrates which may be used to prepare more dilute inks and to minimise the chance of precipitation of colorant if evaporation of the medium occurs during storage of the ink. It is preferred that the dye is dissolved completely in the medium to form a solution.

The ink may contain a single dye or a mixture of two or more of the hereinbefore defined dyes.

Aqueous-based ink compositions are generally used in office or home printers whereas organic solvent based ink compositions find use in industrial continuous printers.

When the medium is a mixture of water and one or more water-soluble organic solvent(s). The weight ratio of water to water-soluble organic solvent(s) is preferably from 99:1 to 1:99, more preferably from 99:1 to 50:50 and especially from 95:5 to 80:20. The water-soluble organic solvent(s) is preferably selected from $C_{1-4}$-alkanols such as methanol, ethanol, n-propanol, isopropanol, n-butanol, sec-butanol, tert-butanol or isobutanol; cyclic alkanols such as cyclohexanol and cyclopentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkyl-ethers of polyhydric alcohols such as 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)-ethoxy]-ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, such as ethyleneglycol, diethyleneglycol, triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

When the medium is a mixture of water and one or more water-soluble organic solvent(s), it preferably also contains a humectant to inhibit evaporation of water and preservative to inhibit the growth of fungi, bacteria and/or algae in the solution. Examples of suitable humectants are, propan-1,2-diol, butan-1,2-diol, butan-2,3-diol and butan-1,3-diol.

Examples of further suitable ink media are given in U.S. Pat. No. 4,963,189, U.S. Pat. No. 4,703,113, U.S. Pat. No. 4,626,284 and EP 4,251,50A which are incorporated herein by reference thereto.

Where the liquid medium is an organic solvent the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Organic solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids and alcohols, preferably those with $C_{18-24}$ chains, or sulphonamides. The dye may be dissolved in the low melting point solid or may be finely dispersed in it.

It is preferred that the medium is a mixture of water and one or more water-soluble organic solvent(s).

The inks may optionally contain other components conventionally used in inks for ink jet printing. For example, viscosity and surface tension modifiers, corrosion inhibitors, kogation reducing additives, and surfactants which may be ionic or non ionic.

A particularly preferred ink composition comprises:
(a) 0.5 to 20 parts of the dye;
(b) 2 to 60 parts of water-soluble organic solvent(s); and
(c) 1 to 95 parts water.
wherein all parts are parts by weight based upon the total weight of the ink and the parts (a)+(b)+(c)=100.

In addition to the parts (a), (b) and (c) the ink may contain other additional components conventionally used in ink formulations as hereinbefore defined.

It is preferred that the ink has a pH greater than 7, more preferably a pH in the range of from 7.1 to 13 and especially from 10 to 12. The pH of the ink may be adjusted to the desired level by the addition of a suitable base, for example ammonia or an optionally substituted $C_{1-4}$-alkylamine to the ink during its formulation.

According to a second aspect of the present invention there is provided a process for printing a substrate with an ink composition using an ink jet printer, characterised in that the ink composition is as hereinbefore in the first as part of the present invention.

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

It is preferred that the ink used in the process has a pH greater than 7, more preferably a pH in the range of from 7.1 to 13 and especially from 10 to 12.

The substrate used in the ink jet printing process is preferably paper, plastics, a textile materials, metal or glass and is more preferably paper, plastic or a textile material.

Preferred textile materials are natural, semi-synthetic or synthetic material. Examples of natural textile materials include wool, silk, hair and cellulosic materials, particularly cotton, jute, hemp, flax arid linen. Examples of synthetic and semi-synthetic materials include polyamides, polyesters, polyacrylonitriles and polyurethanes.

Preferred papers are plain and treated papers which may have an acid, alkaline or neutral character.

Especially preferred substrates include overhead projector slides, plain and treated papers and synthetic or semisynthetic textile materials such as polyester.

The preferred ink compositions used in the process is as hereinbefore described.

According to a third aspect of the present invention there is provided a paper or an overhead projector slide or textile material printed with an ink composition according to the first aspect of the present invention, or by means of the process according to the second aspect of the present invention.

According to a fourth aspect of the present invention there is provided a process for the coloration of a textile material with any of the ink compositions according to the first aspect of the present invention which comprises the steps:
i) applying the ink composition to the textile material by ink jet printing; and
ii) heating the textile material at a temperature from 50° C. to 250° C. to fix the dye on the material.

The process for coloration of a textile material by ink jet printing preferably comprises a pre-treatment of the textile material with an aqueous pretreatment composition comprising a water-soluble base, a hydrotropic agent and a thickening agent followed by removing water from the pre-treated textile material to give a dry pre-treated textile material which is subjected to ink jet printing in step i) above.

The pretreatment composition preferably comprises an solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pretreatment to promote the formation of a covalent bond between the dye and the pretreated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehydelammonium chloride condensate e.g. MATEXIL™ FC-PN (available from ICI), which have a strong affinity for the textile material and the dye, even dye which has been rendered unreactive by hydrolysis of the reactive group, and thus increase the fixation of the dye on the textile material.

Examples of anti-migration agents are low molecular weight acrylic resins, e.g. polyacrylates, such as poly(acrylic acid) and poly(vinyl acrylate).

Where the dye contains a halotriazine reactive group, it has been found that the yield of dye fixed to the textile material can be improved by the addition to the pretreatment composition of certain tertiary amines which are capable of interacting with the reactive group so as to replace the halogen atom and form a quaternary nitrogen leaving group, corresponding to the tertiary amine, which is displaced during fixation reaction of the dye with the textile material. It is therefore a preferred feature of the present process that the pretreatment composition also contains such a tertiary amine. Any tertiary amine may be used, but a preferred tertiary amines are substantially odourless compounds such as 1,4-diazabicyclo[2.2.2octane (DABCO) and susbtituted pyridines, preferably carboxypyridines, and especially those in which the pyridine ring is substituted by a carboxylic acid group in the 3 or 4 position, such as nicotinic or isonicotinic acid.

However, when further agents are added to the pretreatment composition, care must be taken to balance their effects and to avoid interactions with the other ingredients of the composition.

In the pre-treatment stage of the present process the pretreatment composition is preferably evenly applied to the textile material. Where a deeply penetrated print or a deep shade is required the pretreatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the reactive group is labile even in neutral environment, hydrolysis of the reactive group on the dye in the aqueous composition and during the fixation can be inhibited by use, as humectant, of a glycol or mixture of glycols, in which not more than one hydroxy group is a primary hydroxy group. Examples of suitable humectants are, propan-1,2-diol, butan-1,2-diol, butan-2,3diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the dye and the fibre and thereby to fix the dye on the textile material. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

According to a fifth aspect of the present invention there are provided textile materials, especially cellulosic textile materials, coloured with the ink composition according to the first aspect of the present invention or by means of the a process according to the fourth aspect of the present invention.

According to a sixth aspect of the present invention there is provided a toner resin composition comprising a toner resin and a dye characterised in that the dye is as hereinbefore defined in the first aspect of the present invention.

The toner resin is preferably a thermoplastic resin for example, a styrene or substituted styrene polymer or copolymer, for example, a polystyrene or styrene-butadiene copolymer, especially a styrene-acrylic copolymer, for example, a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, GB 2,090, 008, U.S. Pat. No. 4,206,064 and U.S. Pat. No. 4,407,928 which are incorporated herein by reference thereto.

The toner resin composition preferably contains from 0.1% to 20% of the dye of Formula (1) or a mixture of dyes of Formulae (1) and (4) or mixture of dyes of Formulae (1) and (5) more preferably from 3% to 10% based on the total weight of the toner resin compositions.

The toner resin composition may be prepared by any method known to the art which typically involves mixing the toner resin with the dye of Formula (1) or mixtures of is dyes of Formulae (1) and (4) or mixture of dyes of Formulae (1) and (5) and optionally a charge control agent (CCA) by kneading in a ball mill above the melting point of the resin.

Generally, this involves mixing the molten toner resin composition for several hours at temperatures from 120 to 200° C., in order to uniformly distribute the opional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

The CCA is present in the toner at from 0.1 to 5% based upon the total weight of the toner.

Further suitable examples of CCA's are described in WO 94123344 which is incorporated herein by reference thereto.

The invention is further illustrated by the following Examples in which all parts and percentages are by weight unless otherwise stated.

EXAMPLE 1

Preparation of

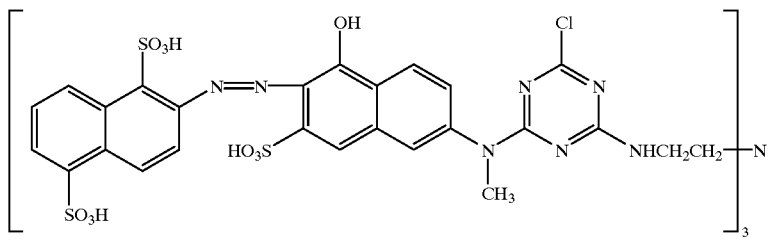

Stage a)
1-hydroxy-2-(1,5-disulphonaphth-2-ylazo)-6-N-(4,6-dichloro-s-triazin-2-yl)methylamino]-naphthalene-3-sulphonic acid was prepared by coupling diazotised 2-aminonaphthalene-1,5-disulphonic acid onto N-acetyl-2-methylamino-5-hydroxynaphthalene-7-sulphonic acid, removing the acetyl group by heating to 80° C. in 2N sodium hydroxide solution and reacting the resultant dyebase with cyanuric chloride at 0–5° C.

Stage b)
Tris(β-aminoethyl)amine (1.246 g) was added to a stirred solution of the product from stage a) (36 g, MI 1221) in water (250 cm$^3$). The mixture was stirred at 50° C., pH 8.5, for 2 hours, cooled and methylated spirits was added slowly with stirring, The precipitated dye was collected and dried to give the title product (23 g, MI 2914) having a λmax at 484 nm.

EXAMPLE 2

Preparation of

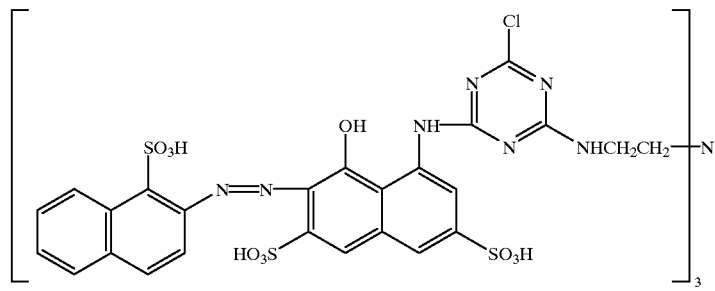

Stage a)
2-(1-sulphonaphthyl-2-azo)-8-(4,6-dichloro-s-triazin-2-ylamino)-1-hydroxy naphthalene-3,6-disulphonic acid was prepared by condensing cyanuric chloride with 1-hydroxy-2-(1-sulphonaphthyl-2-azo)-8-aminonaphthalene-3,6-disulphonic acid at 0–5° C. and pH6.

Stage b)
Tris(β-aminoethyl)amine (0.684 g, 96% strength) was added to a stirred solution of the product from stage a) (0.0148 m) in water (250 cm$^3$). The mixture was stirred at 50° C. and pH 8.5 for 5 hours. A further portion of the product from stage a) (0.0029 mol) was added and the mixture was stirred for a further 2 hours at 50° C. The mixture was allowed to cool to room temperature, salt solution (8% w/v) was added with stirring and the resultant precipitate collected and dried to give the title product (11.0 g, 76% strength) having a λmax at 518 nm and εmax of 102,166.

EXAMPLE 3

Preparation of

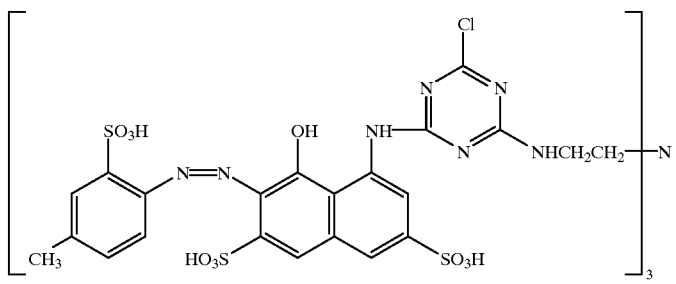

Stage a)

1-hydroxy-2-(2-sulpho4methyl phenyl azo)-8-(4,6-dichloro-a-triazin-2-ylamino)naphthalene-3,6-disulphonic acid was prepared by coupling diazotised 2-amino-5-methylbenzene sulphonic acid onto 1-hydroxy-8-(dichloro-a-triazinylamino) naphthalene-3,6-disulphonic acid.

Stage b)

Tris(β-aminoethyl)amine (1.01 g) was added to a solution of the product from stage a) (43 g, MI 1599) in water (300 cm³). The mixture was stirred at 50° C. and pH 8.5 for 2 hours then allowed to cool to room temperature. Methylated spirits was added slowly with stirring and the resultant precipitate collected and dried to give the title product (30 g) having a λmax at 516 nm.

EXAMPLE 4

The method of Example 2 was repeated except that in place is tris-(β-aminoethyl)amine there was used an equimolar amount of diethylene triamine. The resultant product had a λmax at 518 nm.

EXAMPLE 5

The method of Example 3 was repeated except that in place is tris-(β-aminoethyl)amine there was used an equimolar amount of diethylene triamine. The resultant product had a λmax at 516 nm.

EXAMPLE 6

A solution of 1-hydroxy-6-[N-methyl-N-(dichloro-s-triazinyl)]-amino-2-[3-methyl4-(2,5-disulphophenyl azo) phenyl azo] naphthalene-3-sulphonic acid (0.0248 mmol) and tris(β-aminoethyl)amine (0.0083 mmol) was stirred at pH 8.5 and 45–50° for 6 hours. On cooling, potassium chloride solution (7.5% w/v) was added and the precipitate was collected and dried to give the title product having a λmax at 522 nm, εmax 128,000.

EXAMPLE 7

Preparation of a reactive dye of the formula (10):

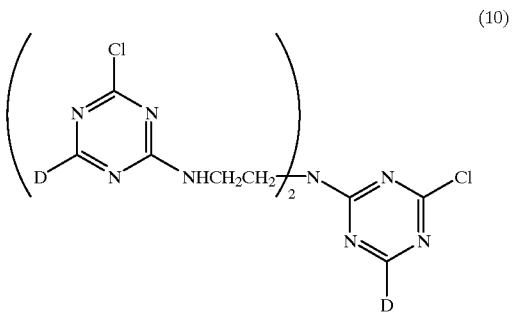

(10)

wherein D is 1-hydroxy-2-(2-sulphophenylazo)-3,6-disulpho naphthyl-8-amino.

Diethylene triamine (8.7 mmol) was added to a solution of 1-dichloro-s-triazinylamino-1-hydroxy-2(2¹-sulphophenylazo-)naphthalene-3,6-disulphonic acid (27.3 mmol) in water (200 cm³). The mixture was stirred at 50° C. and pH 8.5 for 8 hours. On cooling the solution was added to methylated spirits (740p, 1 liter) and the precipitated solid was collected and dried to give the title product (7.8 mmol) having a λmax at 506 nm.

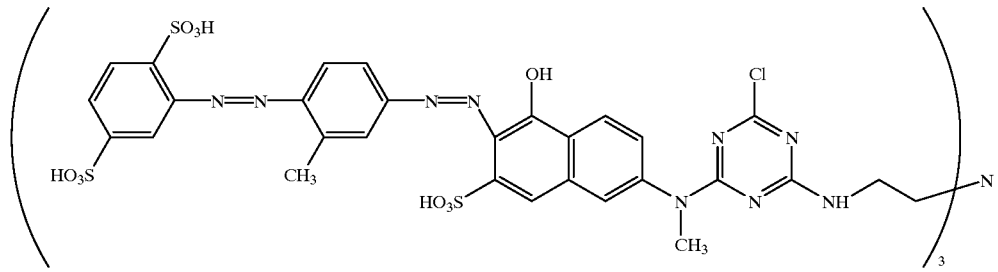

EXAMPLE 8

Preparation of a dye of formula (10) wherein D is

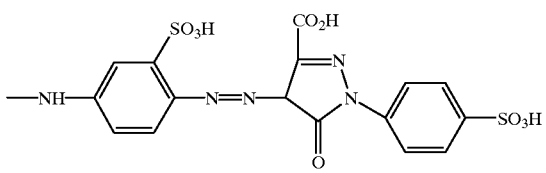

Stage a)

1-(4-sulphophenyl)-3-carboxy-4-(2-sulpho-4-dichloro-s-triazinylamino-phenylazo) pyrazol-5-one was prepared by condensation of 1-(4-sulphophenyl)-3-carboxy-4-(4-amino-2-sulphophenyl azo) pyrazol-5-one with cyanuric chloride at pH 6.5.

Stage b)

Diethylene triamine (8.3 mmol) was added to a solution of the product from stage a) (26.3 mmol) in water (200 cm$^3$). After stirring for 4 hours at 50° C. and pH 8.5 the mixture was added, with stirring, to methylated spirits. The precipitate was filtered-off and dried to give the title product (4.5 mmol) having a λmax at 449 nm.

EXAMPLE 9

Preparation of a dye of formula (10) wherein D is of the formula:

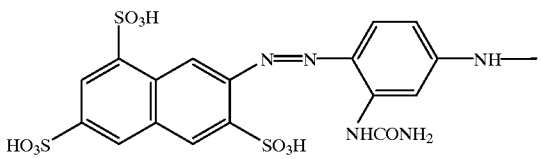

Stage a)

N-(dichloro-s-triazinyl)-3-ureido-4-(3,6,8-trisulpho naphthyl-2-azo) aniline was prepared by condensation, at 0° C. to 5° C. and pH 6.5, of cyanuric chloride with 3-ureido-4-(3,6,8-trisulphonaphthyl-2-azo) aniline.

Stage b)

Diethylenetriamine (5.4 mmol) was added to a solution of the product from stage a) (16.2 mmol) in water (200 cm$^3$). The mixture was stirred at 50° C. and pH 8.5 for 15 hours. After cooling to room temperature the mixture was added to methylated spirits (740 p, 1 liter) and the precipitated solid collected and dried to give the title product (4 mmol) having a λmax at 431 nm.

EXAMPLE 10

Stage a)

The method of Example 3, stage b), was followed except that in place of the product from step a) there was used 1-hydroxy-2-(2$^1$-sulpho-5$^1$-acetylaminophenylazo)-8-(4,6-dichloro-5-triazin-2-ylamino) naphthalene-3,6-disulphonic acid. The resultant reactive dye had a λmax at 505 nm.

EXAMPLE 11

Ink jet printing inks containing dyes described in the foregoing examples may be prepared according to the following formulations shown in Table I wherein the figures denote parts by weight for each stated component:

The following abbreviations are used:

PG = propylene glycol,
DEG = diethylene glycol,
NMP = N-methyl pyrollidone,
DMK = dimethylketone,
IPA = isopropanol,
MEOH = methanol,
2P = 2-pyrollidone,
MIBK = methylisobutyl ketone,
CET = Cetyl ammonium bromide (a surfactant),
BAS = 1:1 mixture by weight of ammonia and methylamine,
PHO = Na$_2$HPO$_4$.

TABLE 1

| Dye From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 1 | 2.0 | 80 | 5 | | 6 | 4 | | | | | 5 | | 3 |
| 2 | 3.0 | 90 | | 5 | 2 | | 0.2 | | | | | | |
| 3 | 1.0 | 85 | 5 | | 2 | 2 | | 0.1 | | 5 | 1 | | |
| 4 | 2.1 | 91 | | 8 | | | | | | | | 1 | |
| 5 | 3.1 | 86 | 5 | | | | | 0.2 | 4 | | | 5 | |
| 6 | 1.1 | 81 | | | 9 | | 0.5 | 0.5 | | | 9 | | |
| 7 | 2.5 | 60 | 4 | 15 | 3 | 3 | | | 6 | 10 | 5 | 4 | |
| 8 | 1.9 | 70 | | 20 | | | | | 10 | | | | |
| 9 | 2.4 | 75 | 5 | 4 | | | | | | 6 | | 5 | 5 |
| 10 | 4.1 | 80 | 3 | 5 | 2 | 10 | | 0.3 | | | | | |
| 11 | 3.2 | 65 | | 5 | 4 | 6 | | | 5 | 4 | 6 | 5 | |
| 2 | 4.6 | 96 | | | | | | | | 4 | | | |
| 3 | 0.8 | 90 | 5 | | | | | 5 | | | | | |
| 4 | 1.2 | 80 | 2 | 6 | 1 | 5 | | | 1 | | 4 | | 1 |
| 5 | 1.8 | 80 | | 5 | | | | | | | 15 | | |
| 6 | 2.6 | 84 | | | 11 | | | | | | 5 | | |
| 7 | 3.3 | 80 | 2 | | | 10 | | | | 2 | | 6 | |
| 8 | 1.7 | 90 | | | 7 | | 0.3 | 3 | | | | | |
| 9 | 1.5 | 69 | 2 | 20 | 2 | 1 | | | | | 3 | 3 | |
| 10 | 1.6 | 91 | | | 4 | | | | | | 4 | | 1 |
| 1 | 10.0 | 70 | 5 | | 6 | 4 | | | | | 5 | | |
| 2 | 8.0 | 85 | | 5 | 2 | | | | | | | | |
| 3 | 12.0 | 77 | 5 | | 2 | | | | | 2 | 2 | | |
| 4 | 9.0 | 76 | | 10 | 2 | | | | | | 3 | | |

TABLE 1-continued

| Dye From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 5 | 11.5 | 77.3 | 5 | | | | | 0.2 | | | 1 | 5 | |
| 6 | 7.0 | 80 | | | 9 | 1 | | | | | 3 | | |
| 8 | 10.4 | 64.6 | | 15 | | | | | 10 | | | | |
| 15 | 8.5 | 73 | 2 | 6 | 1 | 5 | | | | | 4 | | 0.5 |
| 16 | 12.5 | 75 | | | | 8 | 0.5 | | 4 | | | | |
| 17 | 10.0 | 70 | | | 10 | | | | | | 12 | | |
| 9 | 11.0 | 73 | 5 | | 6 | | | | | | 5 | | |
| 20 | 10.0 | 40 | 4 | 15 | 3 | 3 | | | 6 | 10 | 5 | 4 | |

The inks described in Table 1 can be printed onto substrates such as paper and cotton using an ink jet printer.

EXAMPLE 12

The ink compositions shown in Table 1 may be applied to a textile material such as cotton using an ink jet printer. Preferably the textile is pre-treated with a composition comprising:
2.5 pts sodium bicarbonate;
15pts of a 10% aqueous solution of sodium alginate thickening agent;
15 pts of urea;
47.5 pts of water; and
20 parts of Composition A shown in Table 2.

TABLE 2

Composition A

| Component | Parts by Weight |
|---|---|
| Urea | 25 |
| Distearyl Dimethyl Ammonium Chloride | 2.3 |
| Isopropyl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |
| Acetic Acid (80%) | 0.05 |
| Water | 69.0 |

The textile material should be thoroughly soaked with the pretreatment composition in a padding bath and the excess liquor removed by mangling. The material should then be dried in hot air at 100° C. prior to application of the inks shown in Table 1 by an ink jet printer.

The printed textile is preferably heated at a temperature from 100 to 200° C. after application of the ink composition.

We claim:

1. An ink composition comprising a water-soluble reactive dye comprising at least three chromophoric groups linked to a polyamine; and a medium comprising at least one of a low melting point solid, an organic solvent and a mixture of water and one or more water-soluble organic solvent(s).

2. An ink composition according to claim 1 wherein the water-soluble reactive dye comprises 3, 4 or 5 chromophoric groups linked to a polyamine.

3. An ink composition according to claim 1 wherein the polyamine is a linear or branched polyamine.

4. An ink composition according to claim 1 wherein the polyamine to which the chromophoric groups are linked consists of at least three amino groups joined together by optionally substituted aliphatic groups.

5. An ink composition according to claim 1 wherein the chromophoric groups are linked to the polyamine by means of reactive triazine or reactive pyrimidine groups.

6. An ink composition according to claim 1 wherein the polyamine is of formula (I) or (II) wherein each $R^1$ independently is H or alkyl, n has a value of 2 to 10 and p has a value of 2 to 6:

$$R^1-N\left(C_nH_{2n}-N\right)_p-R^1 \quad \text{Formula (I)}$$

$$N\left(C_nH_{2n}-N-\right)_3 \quad \text{Formula (II)}$$
$$\quad\quad\quad R^1$$

7. An ink composition according to claim 1 wherein the water-soluble reactive dye contains at least 3 groups of the formula (III):

$$\text{(III)}$$

wherein:
m is from 1 to 6;
Q is H, optionally substituted alkyl or alkylene;
Y is a labile atom or group; and
D is a chromophoric group.

8. An ink composition according to claim 1 wherein the water-soluble reactive dye is of the formula $N(Z)_3$ wherein each Z independently is of the formula (III):

$$\text{(III)}$$

wherein:
m is from 1 to 6;

Q is H or optionally substituted alkyl;

Y is a labile atom or group; and

D is a chromophoric group.

9. An ink composition according to claim 1 wherein the water-soluble reactive dye is of the formula (IV):

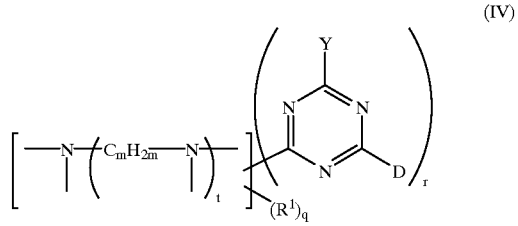

(IV)

wherein t is 2, 3 or 4;

r is 3, 4 or 5;

$R^1$ is H or alkyl;

q is (t+3)−r;

Y is a labile atom or group;

m is from 1 to 6;

D is a chromophore; and at least one D is a chromophore other than an azo chromophore.

10. An ink composition according to claim 1 wherein the medium comprises water and one or more water-soluble organic solvent(s).

11. An ink composition according to claim 1 comprising:

(a) 0.5 to 20 parts of the dye;

(b) 2 to 60 parts of water-soluble organic solvent(s); and (c) 1 to 95 parts water;

wherein all parts are by weight and the parts (a)+(b)+(c)= 100.

12. An ink composition according to claim 1 wherein the ink has a pH greater than 7.

13. A process for printing a substrate with an ink composition comprising forming the ink into small droplets by ejection from a reservoir through a small orifice so that the droplets of the ink are directed at a substrate wherein the ink composition is as defined in claim 1.

14. A paper, an overhead projector slide or a textile material printed with an ink composition according to claim 1 or by means of the process according to claim 13.

15. A process for the coloration of a textile material with any of the ink compositions defined in claim 1 which comprises the steps:

(i) applying the ink composition to the textile material by ink jet printing; and (ii) heating the textile material at a temperature from 50° C. to 250° C. to fix the dye on the material.

16. A toner resin composition comprising a toner resin and a dye wherein in the the dye is as defined in claim 1.

* * * * *